US011909135B2

(12) United States Patent
Liang

(10) Patent No.: US 11,909,135 B2
(45) Date of Patent: Feb. 20, 2024

(54) USB PLUG WITH FIXING STRUCTURE FOR CONVENIENT INSTALLATION

(71) Applicant: TAIZHOU XIANGCHENG OPTOELECTRONICS TECHNOLOGY CO., LTD., Taizhou (CN)

(72) Inventor: Huan Liang, Shangqiu (CN)

(73) Assignee: TAIZHOU XIANGCHENG OPTOELECTRONICS TECHNOLOGY CO., LTD., Taizhou (CN)

( * ) Notice: Subject to any disclaimer, the term of this patent is extended or adjusted under 35 U.S.C. 154(b) by 116 days.

(21) Appl. No.: 17/561,985

(22) Filed: Dec. 26, 2021

(65) Prior Publication Data

US 2023/0178912 A1 Jun. 8, 2023

(30) Foreign Application Priority Data

Dec. 8, 2021 (CN) ......................... 202123092442.8

(51) Int. Cl.
*H01R 12/71* (2011.01)
*H01R 13/506* (2006.01)

(52) U.S. Cl.
CPC ......... *H01R 12/716* (2013.01); *H01R 13/506* (2013.01)

(58) Field of Classification Search
None
See application file for complete search history.

(56) References Cited

U.S. PATENT DOCUMENTS 7,269,004 B1 * 9/2007 Ni ........................ H05K 5/0278 361/679.41
8,215,981 B2 * 7/2012 Liu ........................... G06F 1/20 361/679.54
2004/0145875 A1 * 7/2004 Yu .......................... H05K 5/026 361/752
2007/0076382 A1 * 4/2007 Ni .......................... G11B 33/12 361/752
2007/0076387 A1 * 4/2007 Ni ........................ H01R 13/502 361/760

* cited by examiner

*Primary Examiner* — Oscar C Jimenez

(57) ABSTRACT

The present invention provides a USB plug with fixing structure for convenient installation, and tends to provide a USB plug with better integrity, simple structure and practicability, the key point of the technical solution of the present invention is that a USB plug body includes an upper housing, a lower housing and circuit boards disposed in the upper housing and the lower housing, the USB plug further includes a plug portion including an extending plate integrally connected with the lower housing, a contact pad structure integrally connected with the circuit board and abutting the extending plate, and a metal housing sleeved outside the extending plate and the contact pad structure, and the present invention is applied to the technical field of USB plugs.

8 Claims, 2 Drawing Sheets

USB PLUG WITH FIXING STRUCTURE FOR CONVENIENT INSTALLATION

FIELD OF TECHNOLOGY

The present invention relates to the technical field of USB plugs, in particular to a USB plug with fixing structure for convenient installation.

BACKGROUND

With the development of electronic industry, a variety of data transmission interface structures has been widely used in many electronic devices. USB plugs for many LED lamps are also widely used.

However, the existing USB connectors all adopt exposed metal housings as plugs, and the plug portions are connected by additional connection means, such as welding, but such a connection mode has poor integrity, increased production cost, poor practicability and insufficient simple structure.

SUMMARY

Aiming at the shortcomings of the prior art, the present invention aims to provide a USB plug with fixing structure for convenient installation with better integrity, simple structure and practicability.

To achieve the above purpose, the present invention provides the following technical solution: a USB plug with fixing structure for convenient installation, including a USB plug body including an upper housing, a lower housing and circuit boards disposed in the upper housing and the lower housing, the USB plug further includes a plug portion including an extending plate integrally connected with the lower housing, a contact pad structure integrally connected with the circuit board and abutting the extending plate, and a metal housing sleeved outside the extending plate and the contact pad structure.

The present invention is further configured as follows: a fixing structure is disposed between the metal housing and the upper housing and the lower housing, the fixing structure includes an abutting structure disposed on the upper housing, a spacing between the abutting structure and the extending plate is larger than a spacing between inner walls in a width direction of the metal housing.

The present invention is further configured as follows: the extending plate is provided with an inset groove, and a depth of the inset groove is identical with a thickness of the contact pad structure.

The present invention is further configured as follows: the fixing structure further includes a concave groove structure disposed on two side walls of the extending plate and the abutting structure and a convex structure disposed on the metal housing and fitted with the concave groove structure.

The present invention is further configured as follows: the abutting structure includes a main structure and side structures respectively disposed on both sides of the main structure, and a gap is disposed between the two side structures and the main structure.

The present invention is further configured as follows: a fastening structure is disposed between the inset groove and the contact pad structure, and the fastening structure includes a latching strip structure disposed along an inner wall of the inset groove.

The present invention is further configured as follows: an outlet hole is disposed between the upper housing and the lower housing, and a wire pressing plate is disposed on the upper housing.

By adopting the technical solution, the beneficial effects are as follows: 1. by disposing the plug portion to include an extending plate integrally connected with the lower housing, a contact pad structure integrally connected with the circuit board and abutting the extending plate, and a metal housing sleeved outside the extending plate and the contact pad structure, with the above structural arrangement, the extending plate is integrally connected with the lower housing, and the circuit board is integrally connected with the contact pad structure, when the two are fitted, the present invention features better integrity and simple structure, and when the metal housing is sleeved outside the extending plate and the contact pad structure, a good detachable effect is formed, and the connection structure is convenient, the processing cost is greatly reduced, and the present invention features simple assembly structure;

2. by providing a fixing structure between the metal housing and the upper housing and the lower housing, a good fixing effect is achieved with high stability and simple structure, and by configuring the fixing structure to include an abutting structure disposed on the upper housing, a spacing between the abutting structure and the extending plate being larger than a spacing between inner walls in a width direction of the metal housing, an interference fit is formed when the metal housing is fitted, and the present invention features convenient installation structure, practicality and simple structure.

3. by disposing an inset groove on the extending plate, the depth of the inset groove being identical with the thickness of the contact pad structure, with the above structural arrangement, through the disposed inset groove structure, the connection between the contact pad structure and the extending plate is more stable, the present invention features better integrity, small stress and practicality;

4. by further disposing the fixing structure to further include a concave groove structure disposed on the two side walls of the extending plate and the abutting structure and a convex structure disposed on the metal housing and fitted with the concave groove structure, with the above the structural arrangement, through the fitting between the convex structure and the concave groove structure, the stabilization effect between the metal housing, the extending plate and the abutting structure is further realized, loosening during use is prevented, and the present invention features high stability and simple structure.

Figure 1:
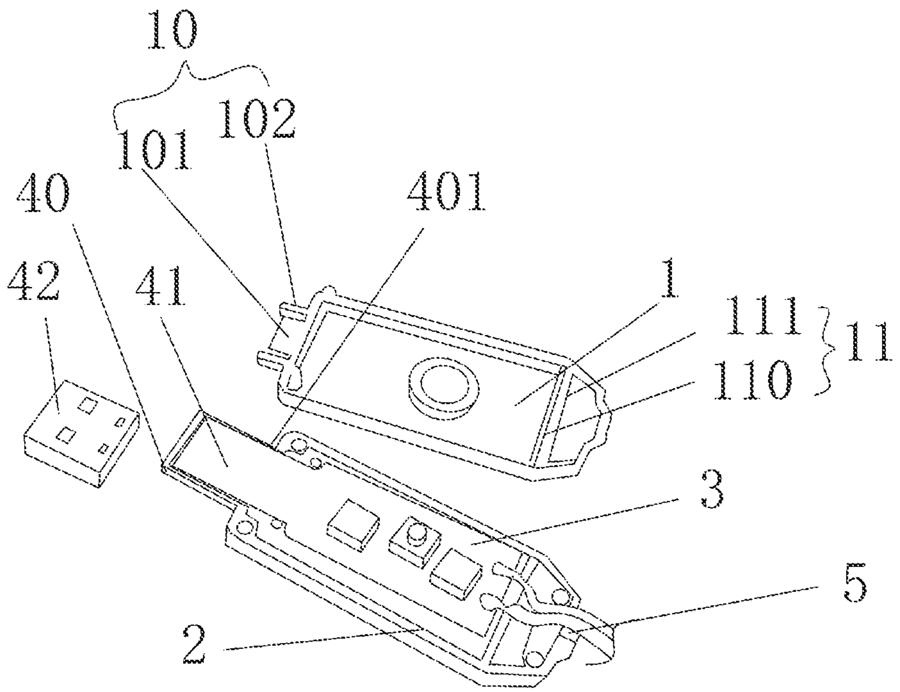
FIG. 1 is a split structure schematic diagram 1 of an embodiment of a USB plug of the present invention.

Reference signs in the drawings: 1, upper housing; 10. abutting structure; 101. main structure; 102. side structure; 11, wire pressing plate; 110, motherboard structure; 111, side board structure; 2, lower housing; 3. circuit board; 40, extending plate; 401, inset groove; 402, concave groove structure; 404, latching strip structure; 41. contact pad structure; 42. metal housing; 5. outlet hole.

DESCRIPTION OF THE EMBODIMENTS

Figure 2:
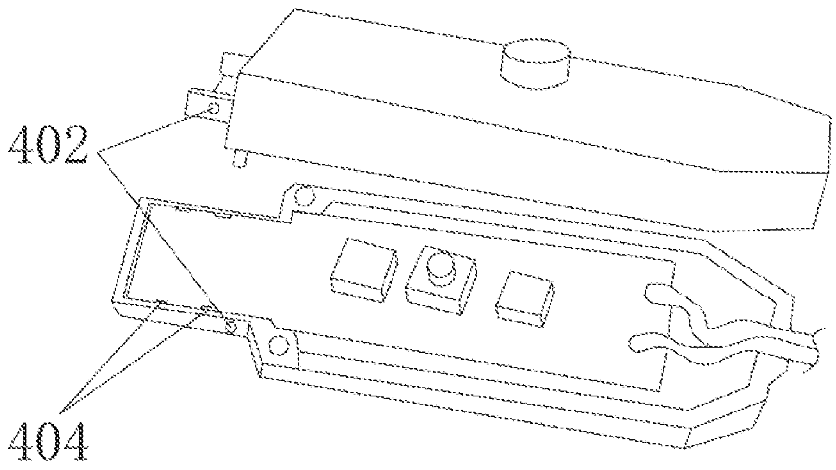
FIG. 2 is a split structure schematic diagram 2 of the embodiment of the USB plug of the present invention.

An embodiment of a USB plug of the present invention is further explained with reference to FIGS. 1 to 2.

A USB plug with fixing structure for convenient installation includes a USB plug body, the USB plug body includes an upper housing 1, a lower housing 2 and a circuit board 3 disposed in the upper and lower housings 2, The USB plug also includes a plug portion, the plug portion includes an extending plate 40 integrally connected with the lower housing 2, a contact pad structure 41 integrally connected with the circuit board 3 and abutting the extending plate 40, and a metal housing 42 sleeved outside the extending plate 40 and the contact pad structure 41. With the above structural arrangement, the extending plate 40 is integrally connected with the lower housing 2, and the circuit board 3 is integrally connected with the contact pad structure 41, when the two are fitted, the present invention features better integrity and simple structure, and when the metal housing 42 is sleeved outside the extending plate 40 and the contact pad structure 41, a good detachable effect is formed, and the connection structure is convenient, the processing cost is greatly reduced, and the present invention features simple assembly structure.

The present invention is further configured that a fixing structure is disposed between the metal housing 42 and the upper and lower housings 2, the fixing structure includes an abutting structure 10 disposed on the upper housing 1, a spacing between the abutting structure 10 and the extending plate 40 is larger than a spacing between inner walls in a width direction of the metal housing 42, by providing a fixing structure between the metal housing 42 and the upper and lower housing 2, a good fixing effect is achieved, the present invention features high stability and simple structure. Moreover, by setting a spacing between the abutting structure 10 and the extending plate 40 to be larger than a spacing between the inner walls in the width direction of the metal housing 42, with the above structural arrangement, an interference fit is formed when the metal housing 42 is fitted, and the present invention features convenient installation structure, practicality and simple structure.

The present invention is further configured that a difference between the spacing between the abutting structure 10 and the extending plate 40 and the spacing of the inner walls in the width direction of the metal housing 42 is between 0.05 mm and 0.1 mm, with the above structural arrangement, it is easy to form a better interference fit effect under the condition of ensuring convenient installation, and the present invention features high stability and simple structure.

The present invention is further configured that the extending plate 40 is provided with an inset groove 401, a depth of the inset groove 401 is identical with a thickness of the contact pad structure 41, by disposing the inset groove 401 on the extending plate 40, the depth of the inset groove 401 being identical with the thickness of the contact pad structure 41, with the above structural arrangement, through the disposed inset groove 401 structure, the connection between the contact pad structure 41 and the extending plate 40 is more stable, the present invention features better integrity, small stress and practicality.

The present invention is further configured that the fixing structure further includes a concave groove structure 402 disposed on the two side walls of the extending plate 40 and the abutting structure 10 and a convex structure disposed on the metal housing 42 and fitted with the concave groove structure 402, with the above the structural arrangement, through the fitting between the convex structure and the concave groove structure 402, the stabilization effect between the metal housing 42, the extending plate 40 and the abutting structure 10 is further realized, to prevent loosening during use, and the present invention features high stability and simple structure.

The present invention is further configured that the abutting structure 10 includes a main structure 101 and side structures 102 respectively disposed on both sides of the main structure 101, a gap is disposed between the two side structures 102 and the main structure 101, and the gap structure has a certain elastic space through the gap between the main structure 101 and the side structure 102. When the side structure 102 is stressed, an opposite force is formed, and the fitting stability between the side structure 102 and the metal housing 42 is improved.

The present invention is further configured that a fastening structure is provided between the inset groove 401 and the contact pad structure 41, the fastening structure includes a latching strip structure 404 disposed along the inner wall of the inset groove 401, the latching strip structure 404 is provided with an inner groove structure, and the latching strip structure 404 disposed along the inner wall of the inset groove 401 is further disposed in the inset groove 401, thus forming a good fastening effect on the contact pad structure 41, thus ensuring the connection stability between the contact pad structure 41 and the inset groove 401, and the present invention features practicality and simple structure.

The present invention is further configured that a ratio between a length of the contact pad structure 41 and a length of the circuit board 3 is between 1:2.5 and 1:3. With the above structural arrangement, an uniformity of a stress point is ensured by controlling the length of the contact pad structure 41, the structural stability between the contact pad structure 41 and the lower housing 2 is improved, and the present invention features practicality and simple structure.

The present invention is further configured that an outlet hole 5 is disposed between the upper housing 1 and the lower housing 2, the upper housing 1 is provided with a wire pressing plate 11, the wire pressing plate 11 includes a motherboard structure 110 and side board structures 111 respectively disposed on both sides of the motherboard structure 110. With the above structural arrangement, the fastening effect on wires is ensured through the fitting between the motherboard structure 110 and the side board structures 111, and a pressure is exerted on the wires, thereby improving good structural stability, the present invention features practicality and simple structure.

The present invention is further configured that a height of the motherboard structure 110 is larger than that of the side board structure 111, with the above structural arrangement, a height difference is formed between the motherboard structure 110 and the side board structure 111, and the motherboard structure 110 and the side board structure 111 form a step-like structure, when the upper housing 1 is fitted with the lower housing 2, a good engagement effect on the wire is formed, the present invention features high stability and simple structure.

The above are only the preferred embodiments of the present invention and do not need to limit the present invention. Usual changes and substitutions made by those skilled in the art within the technical solution range of the present invention should be included in the protection range of the present invention.

What is claimed is:

1. A USB plug with fixing structure for convenient installation, comprising a USB plug body comprising an upper housing (1), a lower housing (2) and circuit boards (3) disposed in the upper housing (1) and the lower housing (2), wherein the USB plug further comprises a plug portion comprising an extending plate (40) integrally connected with the lower housing (2), a contact pad structure (41) integrally connected with the circuit board (3) and abutting the extending plate (40), and a metal housing (42) sleeved outside the extending plate (40) and the contact pad structure (41);

a fixing structure is disposed between the metal housing (42) and the upper housing and the lower housing (2), the fixing structure comprises an abutting structure (10) disposed on the upper housing (1), and a spacing between the abutting structure (10) and the extending plate (40) is larger than a spacing between inner walls in a width direction of the metal housing (42);

wherein the abutting structure (10) comprises a main structure (101) and side structures (102) respectively disposed on both sides of the main structure (101), and a gap is disposed between the two side structures (102) and the main structure (101).

2. The USB plug with fixing structure for convenient installation according to claim 1, wherein a difference between the spacing between the abutting structure (10) and the extending plate (40) and the spacing of the inner walls in the width direction of the metal housing (42) is between 0.05 mm and 0.1 mm.

3. The USB plug with fixing structure for convenient installation according to claim 1, wherein the extending plate (40) is provided with an inset groove (401), and a depth of the inset groove (401) is identical with a thickness of the contact pad structure (41).

4. The USB plug with fixing structure for convenient installation according to claim 3, wherein a fastening structure is provided between the inset groove (401) and the contact pad structure (41), the fastening structure comprises a latching strip structure (404) disposed along an inner wall of the inset groove (401), and the latching strip structure (404) is provided with an inner groove structure.

5. The USB plug with fixing structure for convenient installation according to claim 1, wherein the fixing structure further comprises a concave groove structure (402) disposed on two side walls of the extending plate (40) and the abutting structure (10) and a convex structure (402) disposed on the metal housing (42) and fitted with the concave groove structure (402).

6. The USB plug with fixing structure for convenient installation according to claim 1, wherein a ratio between a length of the contact pad structure (41) and a length of the circuit board (3) is between 1:2.5 and 1:3.

7. The USB plug with fixing structure for convenient installation according to claim 1, wherein an outlet hole (5) is disposed between the upper housing (1) and the lower housing (2), the upper housing (1) is provided with a wire pressing plate (11), the wire pressing plate (11) comprises a motherboard structure (110) and side board structures (111) respectively disposed on both sides of the motherboard structure (110).

8. The USB plug with fixing structure for convenient installation according to claim 7, wherein a height of the motherboard structure (110) is larger than that of the side board structure (111).

* * * * *